US012332675B2

(12) United States Patent
Pang et al.

(10) Patent No.: US 12,332,675 B2
(45) Date of Patent: Jun. 17, 2025

(54) LOW-DROPOUT REGULATOR HAVING BIDIRECTIONAL CURRENT ADJUSTMENT

(71) Applicant: SigmaStar Technology Ltd., Fujian (CN)

(72) Inventors: Zhen-Yang Pang, Shanghai (CN); Hao Wang, Shanghai (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 302 days.

(21) Appl. No.: 18/084,623

(22) Filed: Dec. 20, 2022

(65) Prior Publication Data

US 2023/0236615 A1 Jul. 27, 2023

(30) Foreign Application Priority Data

Jan. 21, 2022 (CN) ......................... 202210073772.2

(51) Int. Cl.
*G05F 1/575* (2006.01)
*G05F 1/59* (2006.01)

(52) U.S. Cl.
CPC ................ *G05F 1/575* (2013.01); *G05F 1/59* (2013.01)

(58) Field of Classification Search
CPC ................................... G05F 1/575; G05F 1/59
See application file for complete search history.

(56) References Cited

U.S. PATENT DOCUMENTS 6,177,785 B1 * 1/2001 Lee ......................... G05F 3/247 323/349
9,411,348 B2 * 8/2016 Iacob ...................... G05F 1/575
11,539,356 B2 * 12/2022 Esch .................... H03K 17/687

FOREIGN PATENT DOCUMENTS

EP 4250054 * 11/2021

* cited by examiner

*Primary Examiner* — Kyle J Moody
(74) *Attorney, Agent, or Firm* — Edell, Shapiro & Finnan, LLC

(57) ABSTRACT

A low-dropout regulator includes a voltage divider circuit, an operation amplifier, a regulator circuit and an output circuit. The voltage divider circuit divides a power supply voltage to generate a predetermined voltage. The operational amplifier generates a bias voltage according to the predetermined voltage and an output voltage of an output terminal. The regulator circuit generates a first regulated voltage and a second regulated voltage according to the bias voltage. The output circuit adjusts a difference between a first current and a second current according to the first regulated voltage and the second regulated voltage to regulate the output voltage.

10 Claims, 2 Drawing Sheets

LOW-DROPOUT REGULATOR HAVING BIDIRECTIONAL CURRENT ADJUSTMENT

This application claims the benefit of China application Serial No. CN202210073772.2, filed on Jan. 21, 2022, the subject matter of which is incorporated herein by reference.

BACKGROUND OF THE INVENTION

Field of the Invention

The present application relates to a low-dropout regulator, and more particularly, to a low-dropout regulator capable of sinking a current to an output terminal and sourcing a current from the output terminal.

Description of the Related Art

A low-dropout regulator is a type of direct-current (DC) voltage regulator, and is frequently used to provide a voltage to multiple circuits in an electronic device. One purpose of using the low-dropout regulator is to maintain the voltage at a target level when these circuits apply the voltage.

In some related arts, a low-dropout regulator controls a P-type transistor arranged between a power supply source and the output terminal, so as to use limit the voltage by using a resistance value of the P-type transistor. The P-type transistor is operated as a pass transistor, and is capable of merely unidirectionally transferring a current to the output terminal. As a result, application scenarios of such type of low-dropout regulator are quite limited.

SUMMARY OF THE INVENTION

A low-dropout regulator having bidirectional current adjustment so as to improve the issues of the prior art.

In some embodiments, the low-dropout regulator includes a voltage divider circuit, an operation amplifier, a regulator circuit and an output circuit. The voltage divider circuit divides a power supply voltage to generate a predetermined voltage. The operational amplifier generates a bias voltage according to the predetermined voltage and an output voltage of an output terminal. The regulator circuit generates a first regulated voltage and a second regulated voltage according to the bias voltage. The output circuit adjusts a difference between a first current and a second current according to the first regulated voltage and the second regulated voltage to regulate the output voltage.

In some embodiments, the low-dropout regulator is capable of performing bidirectional current adjustment on the output terminal to regulate the output voltage, further supporting a greater power supply voltage range and/or a more stable output voltage, as well as supporting specific application scenarios, thereby improving the issues of conventional low-dropout regulators.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

All terms used in the literature have commonly recognized meanings. Definitions of the terms in commonly used dictionaries and examples discussed in the disclosure of the present application are merely exemplary, and are not to be construed as limitations to the scope and meanings of the present application. Similarly, the present application is not limited to the embodiments enumerated in the description of the application.

The term “coupled” or “connected” used in the literature refers to two or multiple elements being directly and physically or electrically in contact with each other, or indirectly and physically or electrically in contact with each other, and may also refer to two or more elements operating or acting with each other. As given in the literature, the term “circuit” may be a device connected by at least one transistor and/or at least one active element by a predetermined means so as to process signals.

Figure 1:
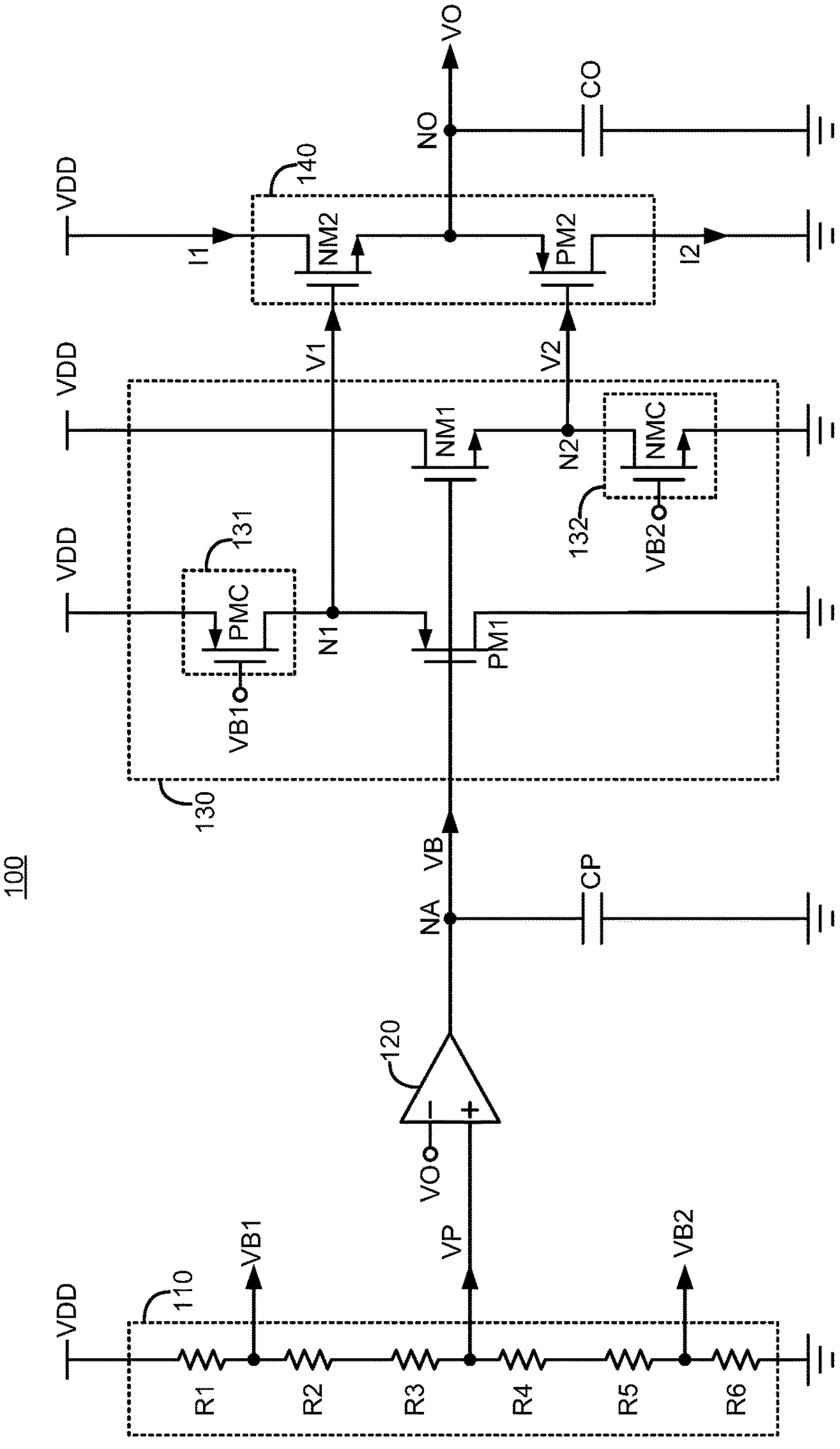
FIG. 1 is a schematic diagram of a low-dropout regulator according to some embodiments of the present application.

FIG. 1 shows a schematic diagram of a low-dropout regulator (LDO) 100 according to some embodiments of the present application. In some embodiments, the low-dropout regulator 100 can provide a stable voltage to other circuits (for example but not limited to, a driver circuit of an input/output interface).

The low-dropout regulator 100 includes a voltage divider circuit 110, an operation amplifier (OA) 120, a regulator circuit 130 and an output circuit 140. The voltage divider circuit 110 divides a power supply voltage VDD to generate a predetermined voltage VP. In some embodiments, the predetermined voltage VP is an intermediate voltage of the power supply voltage VDD, and can be represented as VP=0.5*VDD. In some embodiments, the voltage divider circuit 110 can divide the power supply voltage VDD to generate a voltage VB1 and a voltage VB2, which can be used to bias the operational amplifier 120 and the regulator circuit 130. In some embodiments, the voltage divider circuit 110 includes multiple resistive components R1 to R6 connected in parallel. One terminal of the resistive component R1 receives the power supply voltage VDD, and the other terminal of the resistive component R1 is coupled to the ground via the remaining resistive components R2 to R6. As such, the predetermined voltage VP, the voltage VB1 and the voltage VB2 can be generated through end points among these resistive components R1 to R6. It should be understood that, the number of the resistive components can be adjusted according to different voltage values required or different resistive values used. Hence, it should be noted that the number of resistive components above is an example, and is not to be construed as a limitation to the present application. In some embodiments, the voltage VB1 and the voltage VB2 are not generated by the voltage divider circuit 110 but are generated by a current mirror circuit.

Figure 2:
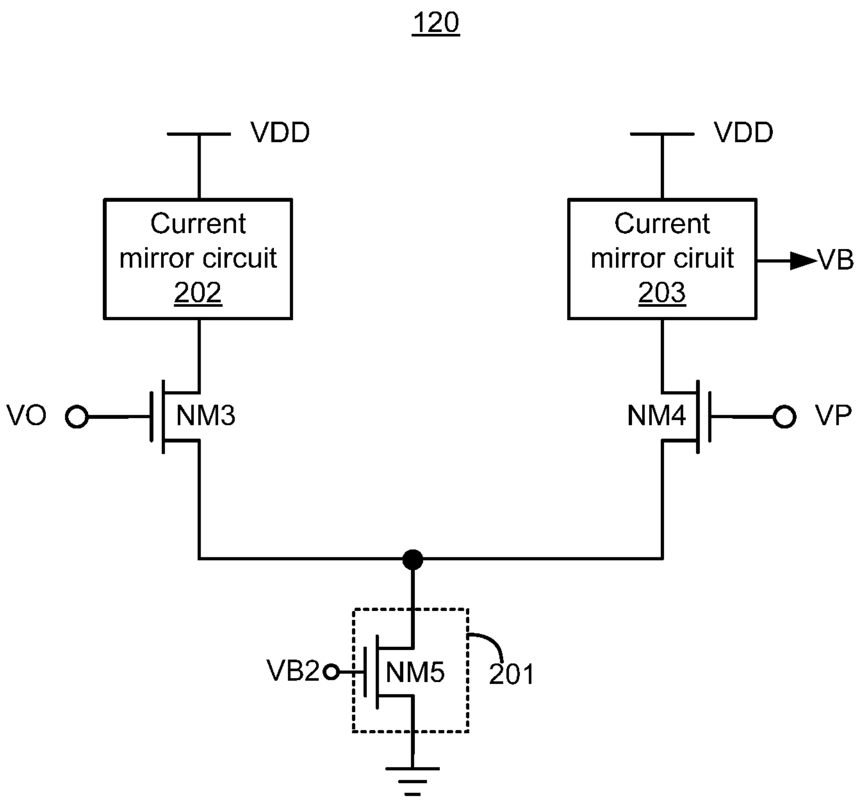
FIG. 2 is a schematic diagram of an operational amplifier in FIG. 1 according to some embodiments of the present application.

The operational amplifier 120 generates a bias voltage VB according to the predetermined voltage VP and an output voltage VO. More specifically, a positive input terminal of the operational amplifier 120 is coupled to the voltage divider circuit 110 to receive the predetermined voltage VP. A negative input terminal of the operational amplifier 120 is coupled to an output terminal NO to receive the output terminal VO on the output terminal NO. An output terminal (denoted as a node NA) of the operational amplifier 120 outputs the bias voltage VB. In some embodiments, as shown in FIG. 2, the operational amplifier 120 further receives the voltage VB2 generated by the voltage divider circuit 120, so as to set the bias of some components in the operational amplifier 120.

The regulator circuit 130 is coupled to the node NA to receive the bias voltage VB. The regulator circuit 130 generates a regulated voltage V1 and a regulated voltage V2 according to the bias voltage VB. In some embodiments, the regulator circuit 130 includes a transistor PM1, a current source circuit 131, a transistor NM1 and a current source circuit 132. The transistor PM1 generates the regulated voltage V1 at a node N1 according to the bias voltage VB. The current source circuit 131 can be biased according to the voltage VB1, and is coupled together with transistor PM1 to the node N1 to bias the transistor PM1. More specifically, the current source circuit 131 can include a transistor PMC. A first terminal (for example, the source) of the transistor PMC receives the power supply voltage VDD, a second terminal (for example, the drain) of the transistor PMC is coupled to the node N1 and a first terminal of the transistor PM1 and generates the regulator voltage V1, and a control terminal (for example, the gate) of the transistor PMC is coupled to the voltage divider circuit 110 to receive the bias voltage VB1. A second terminal of the transistor PM1 is coupled to the ground, and a control terminal (for example, the gate) of the transistor PM1 is coupled to the node NA to receive the bias voltage VB. With the configuration above, a work point of the transistor PM1 can be set based on a current generated by the current source circuit 131 and the bias voltage VB.

Similarly, the transistor NM1 generates the regulated voltage V2 at a node N2 according to the bias voltage VB. The current source circuit 132 can be biased according to the voltage VB2, and is coupled together with transistor PM2 to the node N2 to bias the transistor NM1. More specifically, the current source circuit 132 can include a transistor NMC. A first terminal (for example, the drain) of the transistor NM1 receives the power supply voltage VDD, a second terminal (for example, the source) of the transistor NM1 is coupled to the node N2 and a first terminal of the transistor NMC and generates the regulator voltage V2, and a control terminal (for example, the gate) of the transistor NM1 is coupled to the node NA to receive the bias voltage VB. A second terminal of the transistor NMC is coupled to the ground, and a control terminal (for example, the gate) of the transistor NMC is coupled to the voltage divider circuit 110 to receive the bias voltage VB2. With the configuration above, a work point of the transistor NM1 can be set based on a current generated by the current source circuit 132 and the bias voltage VB. It should be noted that the configuration details of the current source circuit 131 and the current source circuit 132 above are examples, and are not to be construed as limitation to the present application. Various types of current source circuits are encompassed within the scope of the present application.

The output circuit 140 adjusts a difference between a current I1 and a current I2 according to the regulated voltage V1 and the regulated voltage V2 to regulate the output voltage VO. In some embodiments, the output circuit 140 can determine, by adjusting the difference, whether to sink a current to the output terminal NO or to source a current from the output terminal NO. In some embodiments, the output circuit 140 includes a transistor NM2 and a transistor PM2. The transistor NM2 is coupled to the output terminal NO, and adjusts the current I1 according to the regulated voltage V1. The transistor PM2 is coupled between the output terminal NO and the ground, and adjusts the current I2 according to the regulated voltage V2. More specifically, a first terminal of the transistor NM2 receives the power supply voltage VDD, a second terminal of the transistor NM2 is coupled to the output terminal NO to generate the output voltage VO and the current I1, and a control terminal of the transistor NM2 is coupled to the node N1 to receive the regulated voltage V1. A first terminal of the transistor PM2 is coupled to the output terminal NO to source the current I2, a second terminal of the transistor PM2 is coupled to the ground, and a control terminal of the transistor PM2 is coupled to the node N2 to receive the regulated voltage V2.

In some embodiments, the transistor NM1 and the transistor NM2 have the same work status, and the transistor PM1 and the transistor PM2 have the same work status. For example, when the transistor NM1 operates in a linear region, the transistor NM2 also operates in a linear region. Alternatively, when the transistor NM1 operates in a saturation region, the transistor NM2 also operates in a saturation region. The transistor PM1 and the transistor PM2 are also applicable to the relationship above. Thus, when a change occurs in the output voltage VO, the output voltage VO can be automatically regulated with the collaborated operation of these transistors NM1, NM2, PM1 and PM2. Interactive operations of these transistors are to be descried shortly.

In some embodiments, the low-dropout regulator 100 further includes a compensation capacitor CP coupled between the node NA and the ground. The compensation capacitor CP can be used to keep the bias voltage VB stable, and can set the stability of the low-dropout regulator 100 so as to ensure that oscillation is not produced in the low-dropout regulator 100. In some embodiments, the low-dropout regulator 100 further includes a load capacitor CO coupled between the output terminal NO and the ground. The load capacitor CO can be used to keep the output voltage VO stable and filter out part of the noise. In some embodiments, the compensation capacitor CP and the load capacitor CO are both on-chip capacitors.

Operation details of the low-dropout regulator 100 are described below. If the output voltage VO is lower than the predetermined voltage VP, the operational amplifier 120 outputs the bias voltage VB having a higher level. Under this condition, a turning on level of the transistor PM1 is reduced (that is, an equivalent impedance of the transistor PM1 is increased), such that a level of the node N1 is pulled up to a higher level (that is, the regulated voltage V1 is increased) via the current source circuit 131. In response to the regulated voltage V1, the current I1 in a higher value is generated in the transistor NM2. Further, a turning on level of the transistor NM1 is increased (that is, an equivalent impedance of the transistor NM1 is reduced), such that a level of the node N2 is pulled up to a higher level (that is, the regulated voltage V2 is increased) via the transistor NM1. In response to the regulated voltage V2, the current I2 in a lower value is generated in the transistor PM2. In other words, when the output voltage VO is reduced, the regulated voltage V1 and the regulated voltage V2 are increased, such that the output circuit 140 increases the current I1 and reduces the current I2, and accordingly sinks a current (equivalent to a current difference between the current I1 and the current I2) to the output terminal NO. As such, the load capacitor CO is charged, and the output voltage VO accordingly returns a level equal to the level of the predetermined voltage VP.

On the other hand, if the output voltage VO is higher than the predetermined voltage VP, the operational amplifier 120 outputs the bias voltage VB having a lower level. Under this condition, a turning on level of the transistor PM1 is increased (that is, an equivalent impedance of the transistor PM1 is reduced), such that the level of the node N1 is pulled down to a lower level (that is, the regulated voltage V1 is reduced) via the transistor PM1. In response to the regulated voltage V1, the current I1 in a lower value is generated in the transistor NM2. Under this condition, a turning on level of the transistor NM1 is reduced (that is, an equivalent impedance of the transistor NM1 is increased), such that the level of the transistor N2 is pulled down to a lower level (that is, the regulated voltage V2 is reduced) via the current source circuit 132. In response to the regulated voltage V2, the current I2 in a higher value is generated in the transistor PM2. In other words, when the output voltage VO is increased, the regulated voltage V1 and the regulated voltage V2 are also increased, such that the output circuit 140 reduces the current I1 and increases the current I2, and accordingly sources a current (equivalent to a current difference between the current I1 and the current I2) from the output terminal NO. As such, the load capacitor CO is discharged, and the output voltage VO accordingly returns a level equal to the level of the predetermined voltage VP.

Accordingly, it can be understood that the level of each of the regulated voltage V1 and the regulated voltage V2 generated by the regulator circuit 130 is inversely proportional to the output voltage VO. When the output voltage VO is increased, the regulator voltage V1 and the regulator voltage V2 are reduced. Alternatively, when the output voltage VO is decreased, the regulator voltage V1 and the regulator voltage V2 are increased. As such, when a change occurs in the output voltage VO, the regulator circuit 130 can generate the corresponding regulated voltage V1 and regulated voltage V2, so as to adjust the current I1 and the current I2 and determine, according to the difference between the current I1 and the current I2, whether to sink a current to the output terminal NO or source a current from the output terminal NO, hence keeping the output voltage VO stable.

In an experimental example, the transistors NM1, NM2, PM1 and PM2 can be implemented by transistors having a withstand voltage of 1.8 V, wherein dimensions of the transistor NM2 is set to be approximately 15 times of those of the transistor NM1, and dimensions of the transistor PM2 are set to be approximately 15 times of those of the transistor PM1. Under this condition, a static value of the current I1 or the current I2 is approximately 2 mA, and an instant value of the current I1 or the current I2 can reach up to approximately 200 mA, and a voltage jitter range of the output voltage is approximately ±10%. Moreover, in applications that require more levels (for example, a driver circuit of a general purpose input/output (GPIO) interface), the power supply voltage supported by the low-dropout regulator 100 may be within a range between 1.8 and 3.6 V, and the output voltage VO supported may be within a range between 0.9 and 1.8 V. It should be noted that the numerical values given in the description associated with the low-dropout regulator 100 above are examples, and are not to be construed as limitation to the present application.

FIG. 2 shows a schematic diagram of the operational amplifier 120 in FIG. 1 according to some embodiments of the present application. The operational amplifier 120 includes a current source circuit 201, a transistor NM3, a transistor NM4, a current mirror circuit 202 and a current mirror circuit 203. The current source current 201 can bias the transistor NM3 and the transistor NM4. More specifically, the current source circuit 201 can include a transistor NMS. A first terminal of the transistor NM3 is coupled to the current mirror circuit 202, a second terminal of the transistor NM3 is coupled to a first terminal of the transistor NM5, and a control terminal (equivalent to the negative input terminal in FIG. 1) of the transistor NM3 is coupled to the output terminal NO to receive the output voltage VO. A first terminal of the transistor NM4 is coupled to the current mirror circuit 203, a second terminal of the transistor NM4 is coupled to a first terminal of the transistor NM5, and a control terminal (equivalent to the positive input terminal in FIG. 1) of the transistor NM4 is coupled to the voltage divider circuit 110 to receive the predetermined voltage VP. A second terminal of the transistor NM5 is coupled to the ground, and a control terminal of the transistor NM5 is coupled to the voltage divider circuit 110 to receive the voltage VB2. The current mirror circuit 203 is equivalent to an active load of the transistor NM4, and can be used to output the bias voltage VB.

In some embodiments, the control terminal of the transistor MN3 can directly receive the output voltage VO. In some other embodiments, the operational amplifier 120 further includes a transmission circuit (not shown), which can be used to transmit the output voltage VO to the control terminal of the transistor NM3. The transmission circuit can be, for example but not limited to, a buffer circuit or a transmission gate circuit.

In the embodiments above, the multiple transistors NM1 to NM5 are N-type transistors, and the multiple transistors PM1 to PM5 are P-type transistors. The transistors above can be implemented by metal oxide semiconductor field-effect transistors (MOSFET); however, the present application is not limited to the example above. Various types or conductive types capable of implementing similar operations are encompassed within the scope of the present application.

In conclusion, the low-dropout regulator according to some embodiment of the present application is capable of performing bidirectional current adjustment on the output terminal to regulate the output voltage, further supporting a greater power supply voltage range and/or a more stable output voltage, as well as supporting specific application scenarios, thereby improving the issues of conventional low-dropout regulators.

While the present application has been described by way of example and in terms of the preferred embodiments, it is to be understood that the present application is not limited thereto. Various modifications made be made to the technical features of the present application by a person skilled in the art on the basis of the explicit or implicitly disclosures of the present application. The scope of the appended claims of the present application therefore should be accorded with the broadest interpretation so as to encompass all such modifications.

What is claimed is:

1. A low-dropout regulator, comprising:

a voltage divider circuit, dividing a power supply voltage to generate a predetermined voltage;

an operational amplifier, generating a bias voltage according to the predetermined voltage and an output voltage of an output terminal;

a regulator circuit, generating a first regulated voltage and a second regulated voltage according to the bias voltage; and an output circuit, adjusting a difference between a first current and a second current according to the first regulated voltage and the second regulated voltage to regulate the output voltage, wherein the regulator circuit comprises:

a first transistor, generating the first regulated voltage at a first node according to the bias voltage;

a first current source circuit, coupled together with the first transistor to the first node. and biasing the first transistor;

a second transistor, generating the second regulated voltage at a second node according to the bias voltage; and a second current source circuit, coupled together with the second transistor to the second node, and biasing the second transistor.

2. The low-dropout regulator according to claim 1, wherein the output circuit, determines, by adjusting the difference, whether to sink a current to the output terminal or to source a current from the output terminal.

3. The low-dropout regulator according to claim 1, wherein when the output voltage is reduced, the output circuit increases the first current according to the first regulated voltage, and reduces the second current according to the second regulated voltage, so as to sink a current to the output terminal.

4. The low-dropout regulator according to claim 1, wherein when the output voltage is increased, the output circuit reduces the first current according to the first regulated voltage, and increases the second current according to the second regulated voltage, so as to source a current from the output terminal.

5. The low-dropout regulator according to claim 1, wherein a level of each of the first regulated voltage and the second regulated voltage is inversely proportional to a level of the output voltage.

6. The low-dropout regulator according to claim 1, wherein the voltage divider circuit further divides the power supply voltage to generate a first voltage and a second voltage, wherein the first current source circuit is biased by the first voltage, and the second current source circuit is biased by the second voltage.

7. The low-dropout regulator according to claim 1, wherein the output circuit comprises:

a third transistor, coupled to the output terminal, adjusting the first current according to the first regulated voltage; and a fourth transistor, coupled between the output terminal and a ground, adjusting the second current according to the second regulated voltage.

8. The low-dropout regulator according to claim 7, wherein the first transistor and the fourth transistor have a same work status, and the second transistor and the third transistor have a same work status.

9. The low-dropout regulator according to claim 7, wherein dimensions of the third transistor and the fourth transistor are greater than dimensions of the first transistor and the second transistor.

10. The low-dropout regulator according to claim 1, further comprising:

a compensation capacitor, coupled between a node and a ground, wherein the operational amplifier outputs the bias voltage at the node; and a load capacitor, coupled between the output terminal and the ground.

* * * * *